Feb. 8, 1944.   R. LOEWY   2,341,183
REFRIGERATING APPARATUS
Filed July 17, 1941   3 Sheets-Sheet 1

INVENTOR.
RAYMOND LOEWY.
BY Spencer, Hardman and Fahr.

Feb. 8, 1944.   R. LOEWY   2,341,183
REFRIGERATING APPARATUS
Filed July 17, 1941   3 Sheets-Sheet 2

INVENTOR.
RAYMOND LOEWY.
BY

Feb. 8, 1944. R. LOEWY 2,341,183
REFRIGERATING APPARATUS
Filed July 17, 1941 3 Sheets-Sheet 3

INVENTOR.
RAYMOND LOEWY.
BY Spencer, Hardman and Fehr

Patented Feb. 8, 1944

2,341,183

UNITED STATES PATENT OFFICE 2,341,183

REFRIGERATING APPARATUS

Raymond Loewy, New York, N. Y., assignor to General Motors Corporation, Dayton, Ohio, a corporation of Delaware Application July 17, 1941, Serial No. 402,814

10 Claims. (Cl. 62—89)

This invention relates to refrigerating apparatus and more particularly to refrigerator cabinets.

An object of my invention is to provide an improved refrigerator of the type ordinarily installed in compact kitchens such as are found in apartments and the like.

Another object of my invention is to provide an improved food storage arrangement within a refrigerator cabinet which facilitates the preparation of salads and similar dishes to be served at the table and which also facilitates the mixing and serving of drinks during entertainment of guests.

A further object of my invention is to provide at the upper portion of the refrigerated chamber of a household refrigerator cabinet a readily accessible auxiliary space for the storage of vegetables, fruit, bottled beverages and the like, which products are accessible from exteriorly of the front of the cabinet without opening the main food storage chamber door.

In carrying out the foregoing objects, it is a still further object of my invention to provide a household refrigerator cabinet with a drainboard-like top portion closely adjacent the auxiliary storage space of the refrigerated chamber and which is of work-table height to be used in concocting drinks or in mixing and preparing salads and the like prior to serving same.

Other and more specific objects and advantages reside in novel combinations and arrangements of parts of the apparatus as will more fully appear in the course of the following description.

Figure 3:
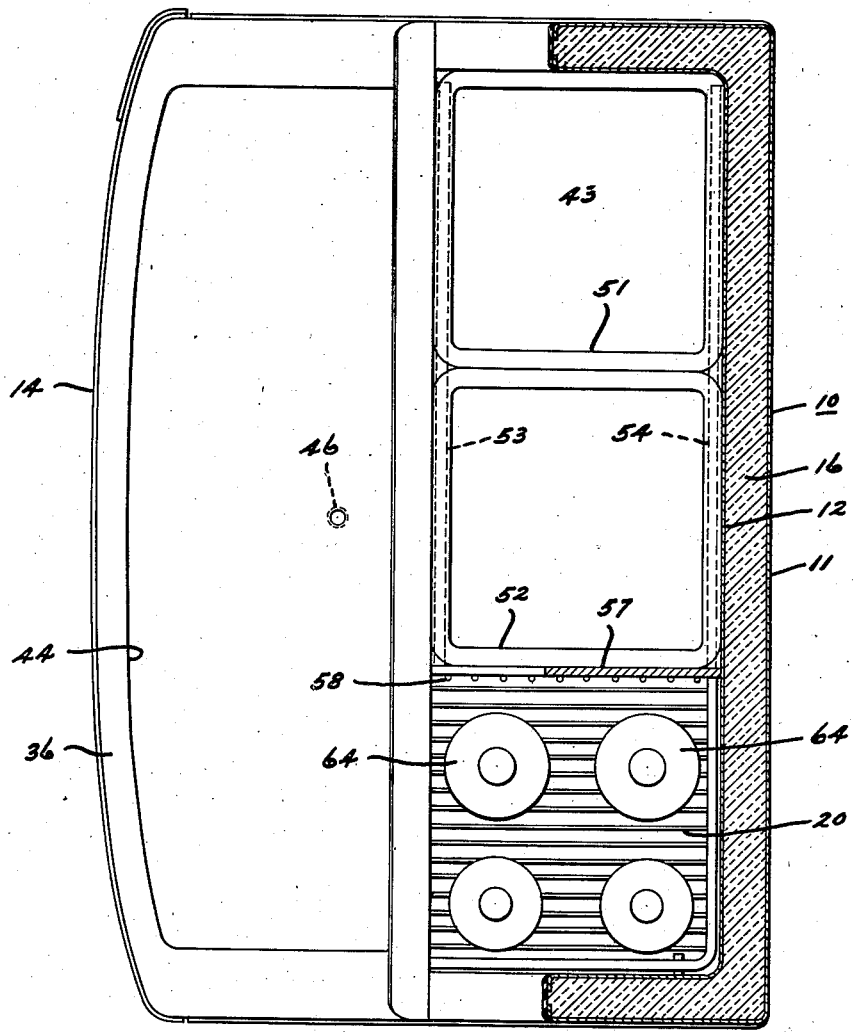
Fig. 3 is a top view of the refrigerator cabinet partly in section and partly in elevation and taken on the line 3—3 of Fig. 2.
Figure 1:
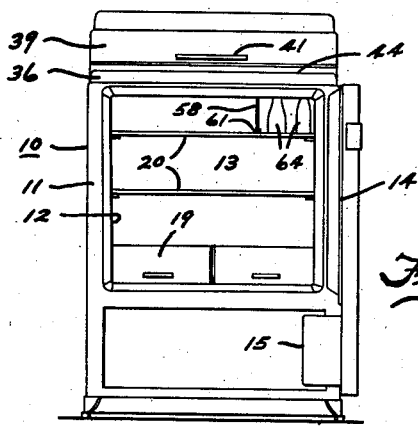
Fig. 1 is a front view of a household refrigerating apparatus having my invention embodied therein and showing the main storage compartment door of the cabinet in open position.
Figure 2:
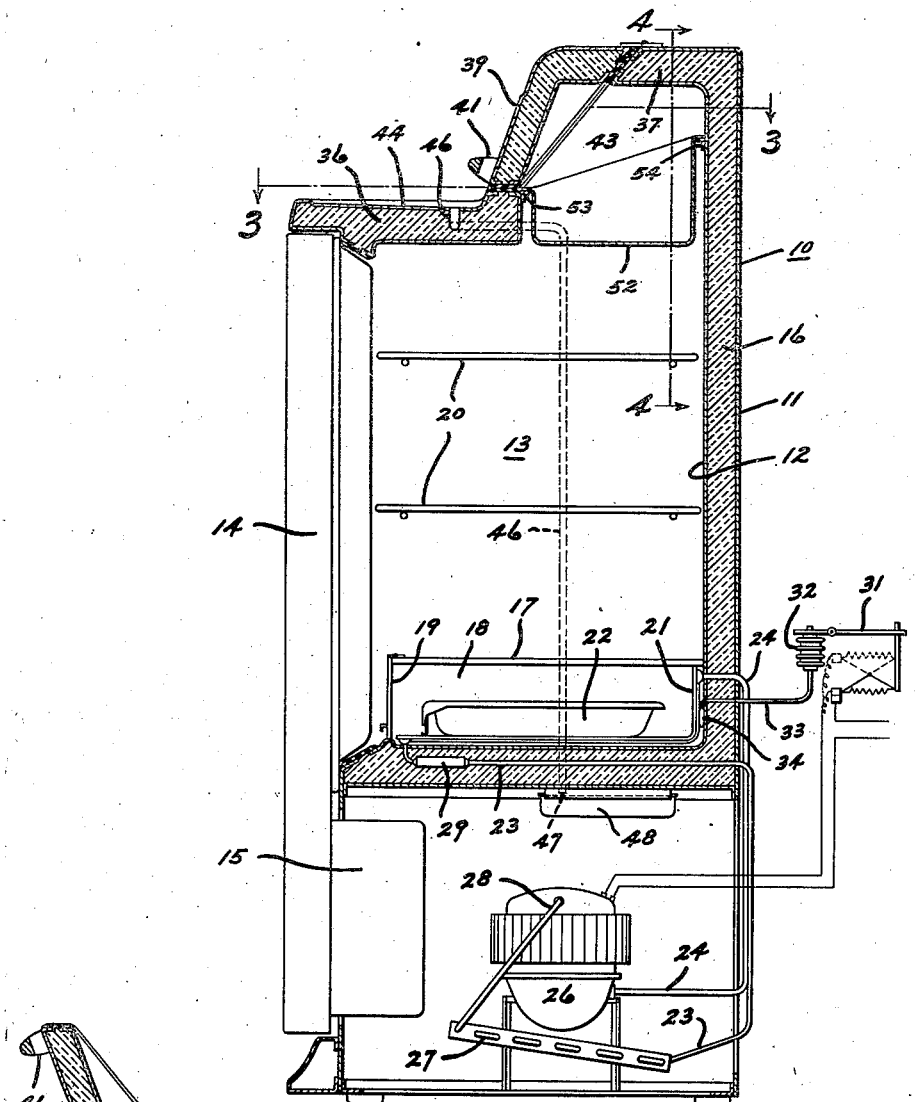
Fig. 2 is an enlarged vertical sectional view of the refrigerating apparatus shown in Fig. 1.

Referring to the drawings, for illustrating my invention, I have shown a refrigerator apparatus comprising a refrigerator cabinet 10 having outer metal walls or panels 11 and an inner metal liner member 12 providing walls of a food storage chamber 13 within the cabinet. An insulated door structure 14 normally closes an opening in the front wall of cabinet 10 which provides access to chamber 13. This door 14 extends beyond the lower insulated wall of chamber 13 to also form a closure for an opening in a machine compartment provided in the bottom of the cabinet 10. A vegetable storage bin 15 may be secured to or mounted upon the inner face of door 14 near the bottom thereof and this bin 15 may swing into and out of the machine compartment with movement of door 14. Any suitable or desirable insulating material 16 (see Fig. 2) may be located between the outer cabinet wall 11 and the liner 12 to insulate the food chamber 13. A metal plate 17 extending horizontally across the lower portion of chamber 13 cooperates with liner 12 to provide a freezing compartment 18 at the bottom of the chamber. A door 19 associated with plate 17 normally closes the front of compartment 18 and provides access thereto when the food chamber door 14 is opened. Vertically spaced apart and horizontally disposed shelves 20 located within the chamber 13 are utilized for supporting food therein. An evaporator 21, of a closed refrigerating system, is mounted in any suitable or desirable manner within the freezing compartment 18. The evaporator 21 may be of the conventional sheet metal type and has a horizontally disposed portion forming a substantially flat support for trays 22 adapted to contain water or other substance to be frozen by the refrigerating effect produced by the evaporator. Evaporator 21 is maintained at a sub-freezing temperature and the conduction of this low temperature through plate 17 and by way of the metal liner walls 12 is ordinarily sufficient to properly cool chamber 13 without perforating the plate and without employing a second evaporator within the chamber. The evaporator 21 is connected by conduits 23 and 24 with a refrigerant compressing and liquefying unit mounted within the machine compartment of cabinet 10. This unit may comprise a sealed motor-compressor 26 and a condenser 27 (see Fig. 2). Refrigerant evaporated in evaporator 21 cools the compartment 18 to a low temperature and also chills the chamber 13 to a high temperature for preserving foods stored therein. The evaporated refrigerant is withdrawn from evaporator 21 by compressor 26 and this compressor compresses the vaporized refrigerant and forwards same under pressure to the condenser 27 by way of a conduit 28. Compressed refrigerant entering condenser 27 is cooled and liquefied, in any suitable or conventional manner, and the liquid refrigerant is forwarded through conduit 23 to evaporator 21 under control of a restrictor 29 interposed in conduit 23 adjacent the refrigerant inlet of evaporator 21. The electric circuit leading to motor-compressor 26 may be controlled by a conventional control switch 31, actuated by a bellows 32 having a conduit connection 33 with a thermostat bulb 34, for controlling the operation of the motor-compressor 26.

Figure 6:
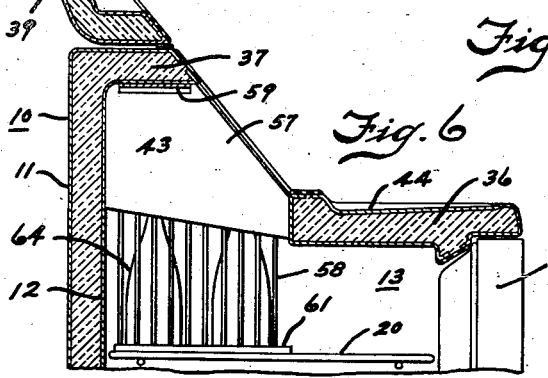
Fig. 6 is a vertical sectional view of the upper part of the refrigerator cabinet taken on the line 6—6 of Fig. 5.
Figure 4:
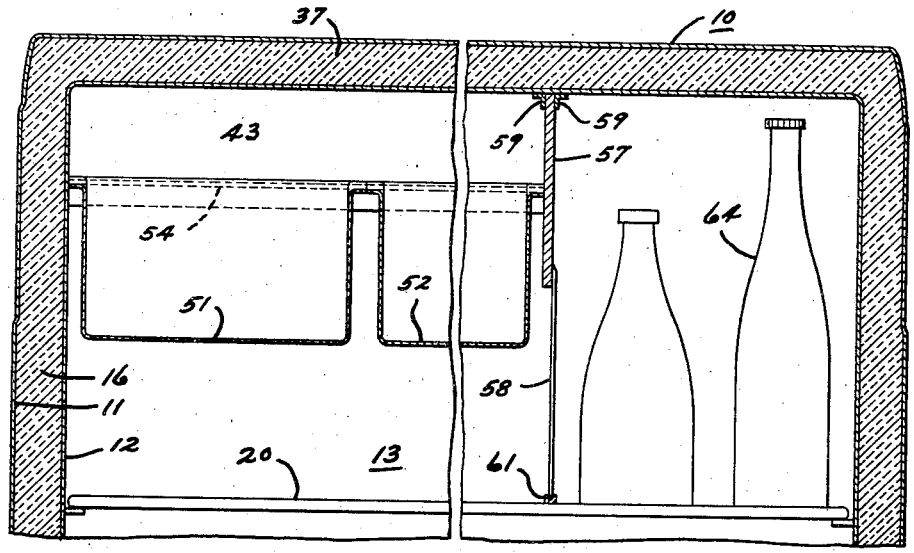
Fig. 4 is a fragmentary enlarged sectional view of the upper portion of the refrigerator cabinet taken on the line 4—4 of Fig. 2.
Figure 5:
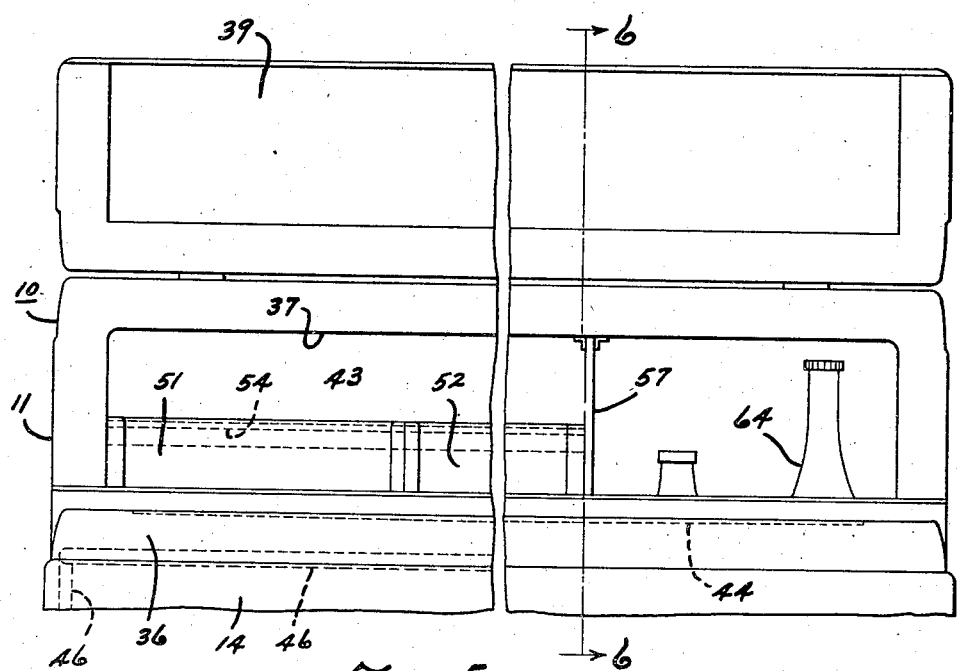
Fig. 5 is a fragmentary enlarged front view of the upper portion of the refrigerator cabinet with the upper door thereof in open position.

In the present disclosure, the top insulated wall of cabinet 10 is divided into two top portions 36 and 37. The back portion 37 of the cabinet top wall is disposed at a greater elevation than the front portion 36 of the cabinet top wall and its front edge is spaced horizontally from the back edge of the front top wall portion 36. A door may be movably mounted intermediate the front edge of the back top wall portion 37 and the back edge of the front top wall portion 36. As herein disclosed, a door 39, provided with a handle 41, is pivotally hinged upon the front edge of the back top wall portion 37 to normally close the opening intermediate the spaced apart edges of the top wall portions 36 and 37. In the present disclosure the door 39 includes an inclined or upright portion and an integral horizontal portion with the horizontal portion thereof forming a complementary part of the cabinet top wall. This construction and arrangement provides a food storage chamber or space 43 upwardly of and along the back of the main storage chamber 13. The top of the front wall portion 36 of cabinet 10 is disposed at an elevation corresponding to the height of the top of a work table ordinarily located in kitchens so as to serve as a work ledge. The upper or exposed surface of the work ledge or wall portion 36 of cabinet 10 is formed of a drain board-like metal element 44 dished or inclined toward a drain opening having a drain pipe 46 connected thereto. Drain pipe 46 may extend downwardly through the insulation of the walls of cabinet 10 with its end 47 terminating above the open top of pan 48 mounted in the upper portion of the machine compartment. The length of the food storage space 43 above the back portion of chamber 13 may be divided into three sections in order to segregate certain foods stored therein from other foods. For example, relatively large receptacles 51 and 52, having their top edge flanged and supported upon supports 53 and 54, are located adjacent one another at one end of the storage space 43. A partition comprising a metal upper part 57 and an open lower part formed of a plurality of spaced apart wires 58 secured to the metal part 57, is disposed adjacent the receptacles 52 and is held in a vertical position by members 59, secured to the top wall portion 37 of the cabinet, and by a U-shaped member 61 supported upon the uppermost shelf of the shelves 20 within chamber 13 (see Figs. 4 and 6). The receptacles 51 and 52 are disposed close together and the upper part 57, of the partition, abuts the flange or receptacle 52 to substantially close off or restrict air circulation from the main chamber 13. Thus the partition and the receptacles cooperate with one another and with walls of cabinet 10 to substantially form a so-called hydrator space of the portion of storage space 43 located above the receptacles 51 and 52 and this hydrator space is cooled through the metal walls of the receptacles. Moisture contained in vegetables stored in receptacles 51 and 52 will be retained by the vegetables since that portion of space 43 above the vegetables is substantially isolated from the main food chamber 13. That part of storage space 43 on the side of the partition opposite receptacle 52 is in open communication with the main chamber 13 and serves as a bottled beverage cooling space. Since such bottles as indicated by the reference character 64 are ordinarily so tall that they cannot be vertically supported within any portion of chamber 13, due to the relatively short distance between shelves 20, they are supported by the uppermost shelf 20 partially within chamber 13 and partially within the storage space 43. These bottled beverages 64 extend upwardly from chamber 13 into the space 43 and are readily accessible through the door opening normally closed by upper door 39 and without the necessity of opening the main food chamber door 14.

Receptacles 51 and 52 are adapted to contain fruits, vegetables and other food products of the variety ordinarily employed in making up salads or desserts to serve at the table. The restricting of air circulation between the main food storage chamber 13 and the space 43, as before stated, is well known in the art and provides better preservation of the fruits and vegetables and maintains these articles fresh and crisp. Dishes may be placed on the work ledge formed by the drain board element 44 and the various salads or fruits withdrawn from the storage space 43, by opening door 39, and segregated in the cutting and mixing of a salad and in the proportioning thereof upon the dishes. Likewise, the work ledge formed by the drain board element 44, may be utilized for supporting glasses in concocting and mixing of drinks. The desired bottles are withdrawn from the refrigerator, after opening door 39, and the drink mix is made upon the work ledge. An ice cube tray 22 may be removed from the freezing compartment 18 and supported upon the work ledge 44 for harvesting of the ice cubes as needed for placing in the glasses containing the drinks. This work ledge of the present refrigerator cabinet may also be utilized as a transfer shelf during the act of relocating various articles stored within the main chamber 13. Any water or other liquid spilled upon the work ledge, formed by the drain board element 44, will flow down the inclined surface thereof to its drain opening and thence downwardly through the pipe 46 and outwardly of its open end 47 into the pan 48. Heat generated by the refrigerant compressing and condensing unit within the machine compartment of cabinet 10 will cause this liquid to evaporate from pan 48 or if desired the pan 48 may be removed from the machine compartment and emptied.

From the foregoing, it will be seen that I have provided an improved refrigerating apparatus by the novel arrangement of refrigerated food storage spaces in the cabinet thereof. The improved arrangement disclosed facilitates the storage of various food products in and the removal thereof from the refrigerated chambers or spaces of the cabinet. I have provided a refrigerator cabinet wherein salads and mixed drinks can be made on the work ledge portion of the cabinet to thus eliminate the necessity of transferring such articles to a work table or other work ledge separate from the refrigerator cabinet. My improved refrigerator cabinet not only saves the user many steps in the kitchen but also eliminates soiling of the kitchen floor which often occurs during the act of transferring articles to and from the refrigerator.

While the form of embodiment of the invention as herein disclosed, constitutes a preferred form, it is to be understood that other forms might be adopted, all coming within the scope of the claims which follow.

What is claimed is as follows:

1. A refrigerating apparatus comprising in combination a household refrigerator cabinet having a plurality of insulated walls forming a main food storage chamber therein, an access opening for said chamber provided in the front wall of said cabinet, a door normally closing said chamber access opening, an evaporator of a closed refrigerating system within said chamber for cooling the interior thereof and for freezing the contents of trays adapted to be thermally associated therewith, the back portion of the cabinet top wall being disposed at a greater elevation than the front portion thereof to provide a food storage space upwardly of and along the back of said main food storage chamber, a receptacle disposed between the back edge of said front portion of said cabinet top wall and the cabinet back wall for supporting articles within said upper food storage space, a door or doors intermediate said portions of said cabinet top wall providing access to the articles supported by said receptacle in the upper food storage space from the front of said cabinet, and said front portion of said cabinet top wall being of a height corresponding to the height of a work table top and serving as a work ledge.

2. A refrigerating apparatus comprising in combination, a household refrigerator cabinet having a plurality of insulated walls forming a main food storage chamber therein, an access opening for said chamber provided in the front wall of said cabinet, a door normally closing said chamber access opening, an evaporator of a closed refrigerating system within said chamber for cooling the interior thereof and for freezing the contents of trays adapted to be thermally associated therewith, the back portion of the cabinet top wall being disposed at a greater elevation than the front portion thereof to provide a food storage space upwardly of and along the back of said main food storage chamber, a receptacle disposed between the back edge of said front portion of said cabinet top wall and the cabinet back wall for supporting articles within said upper food storage space, a door or doors intermediate said portions of said cabinet top wall providing access to the articles supported by said receptacle in the upper food storage space from the front of said cabinet, said front portion of said cabinet top wall being of a height corresponding to the height of a work table top and serving as a work ledge, and said work ledge being in the form of a drain-board having a conduit connected thereto and extending downwardly through the insulated cabinet walls for conveying fluid from said drain-board.

3. A refrigerating apparatus comprising in combination, a household refrigerator cabinet having a plurality of insulated walls forming a main food storage chamber therein, horizontally disposed food supporting shelves vertically spaced apart within said chamber, an access opening for said chamber provided in the front wall of said cabinet, a door normally closing said chamber access opening, an evaporator of a closed refrigerating system within said chamber for cooling the interior thereof and for freezing the contents of trays adapted ot be thermally associated therewith, the back portion of the cabinet top wall being disposed at a greater elevation than the front portion thereof to provide a food storage space upwardly of and along the back of said main food storage chamber, articles supported upon the top shelf of said main food storage chamber and extending into the upper food storage space at one side thereof, a receptacle disposed between the back edge of said front portion of said cabinet top wall and the cabinet back wall for supporting articles within said upper food storage space at the other side thereof, a door intermediate said portions of said cabinet top wall providing access to the articles supported by said receptacle and to the articles extending upwardly from the main food storage chamber into said upper food storage space from the front of said cabinet, and said front portion of said cabinet top wall being of a height corresponding to the height of a work table top and serving as a work ledge.

4. A refrigerating apparatus comprising in combination, a household refrigerator cabinet having a plurality of insulated walls forming a main food storage chamber therein, horizontally disposed food supporting shelves vertically spaced apart within said chamber, an access opening for said chamber provided in the front wall of said cabinet, a door normally closing said chamber access opening, an evaporator of a closed refrigerating system within said chamber for cooling the interior thereof and for freezing the contents of trays adapted to be thermally associated therewith, the back portion of the cabinet top wall being disposed at a greater elevation than the front portion thereof to provide a food storage space upwardly of and along the back of said main food storage chamber, articles supported upon the top shelf of said main food storage chamber and extending into the upper food storage space at one side thereof, a receptacle disposed between the back edge of said front portion of said cabinet top wall and the cabinet back wall for supporting articles within said upper food storage space at the other side thereof, a door intermediate said portions of said cabinet top wall providing access to the articles supported by said receptacle and to the articles extending upwardly from the main food storage chamber into said upper food storage space from the front of said cabinet, said front portion of said cabinet top wall being of a height corresponding to the height of a work table top and serving as a work ledge, and said work ledge being in the form of a drain-board having a conduit connected thereto and extending downwardly through the insulated cabinet walls for conveying fluid from said drain-board.

5. A refrigerating apparatus comprising in combination, a refrigerator cabinet having a plurality of insulated walls forming a main food storage chamber therein, an access opening for said chamber normally closed by a closure member, an evaporator of a closed refrigerating system within said cabinet for cooling air in said chamber, the back portion of the cabinet top wall being disposed at a greater elevation than the front portion thereof to provide an auxiliary food storage space within said cabinet upwardly of said chamber and along the back of the cabinet, a door intermediate said portions of said cabinet top wall providing access to said space, means cooperating with the cabinet walls and with said door for substantially isolating at least a part of said space from the air within said main food storage chamber, said means including means forming a support for food products adapted to be stored in said part of said space, and said front portion of said cabinet top wall being disposed a sufficient distance below the back portion thereof to correspond to the height of a work table top and serving as a work ledge.

6. A refrigerating apparatus comprising in combination, a refrigerator cabinet having a plurality of insulated walls forming a main food storage chamber therein, an access opening for said chamber normally closed by a closure member, an evaporator of a closed refrigerating system within said cabinet for cooling air in said chamber, the back portion of the cabinet top wall being disposed at a greater elevation than the front portion thereof to provide an auxiliary food storage space within said cabinet upwardly of said chamber and along the back of the cabinet, a door intermediate said portions of said cabinet top wall providing access to said space, means intermediate the end walls of said cabinet and cooperating with other walls thereof and with said door for substantially isolating one part of said space from the air within said main food storage chamber, another part of said space being in open communication with the air within said main food storage chamber, said means including means forming a support for food products adapted to be stored in said one part of said space, a shelf disposed within said main food storage chamber below the front portion of said cabinet top wall and extending rearwardly beneath said another part of said space, and articles supported upon said shelf of such height that they extend upwardly into said another part of said space whereby said articles are accessible upon moving said closure member and/or said door into open position.

7. A refrigerating apparatus comprising in combination, a refrigerator cabinet having a plurality of insulated walls forming a main food storage chamber therein, an access opening for said chamber normally closed by a closure member, an evaporator of a closed refrigerating system within said cabinet for cooling air in said chamber, the back portion of the cabinet top wall being disposed at a greater elevation than the front portion thereof to provide an auxiliary food storage space within said cabinet upwardly of said chamber and along the back of the cabinet, a door intermediate said portions of said cabinet top wall providing access to said space, means intermediate the end walls of said cabinet and cooperating with other walls thereof and with said door for substantially isolating one part of said space from the air within said main food storage chamber, another part of said space being in open communication with the air within said main food storage chamber, said means including means forming a support for food products adapted to be stored in said one part of said space, a shelf disposed within said main food storage chamber below the front portion of said cabinet top wall and extending rearwardly beneath said another part of said space, articles supported upon said shelf of such height that they extend upwardly into said another part of said space whereby said articles are accessible upon moving said closure member and/or said door into open position, and said front portion of said cabinet top wall being disposed a sufficient distance below the back portion thereof to correspond to the height of a work table top and serving as a work ledge.

8. A refrigerating apparatus comprising in combination, a refrigerator cabinet having a plurality of insulated walls forming a main food storage chamber therein, an access opening for said chamber and a closure member therefor, a closed refrigerating system associated with said cabinet and including a refrigerant evaporator for cooling the interior of said chamber, the back portion of the cabinet top wall being disposed at a greater elevation than the front portion thereof to provide an auxiliary food storage space within said cabinet upwardly of said chamber and along the back of the cabinet, the front edge of said back portion of the cabinet top wall terminating short of vertical alignment with the back edge of said front portion thereof and providing an access opening for said auxiliary storage space, a door for normally closing said auxiliary storage space access opening, and said door including a horizontally disposed portion forming a complementary part of the back portion of said cabinet top wall.

9. A refrigerating apparatus comprising in combination, a refrigerator cabinet having a plurality of insulated walls forming a main food storage chamber therein, an access opening for said chamber and a closure member therefor, a closed refrigerating system associated with said cabinet and including a refrigerant evaporator for cooling the interior of said chamber, the back portion of the cabinet top wall being disposed at a greater elevation than the front portion thereof to provide an auxiliary food storage space within said cabinet upwardly of said chamber and along the back of the cabinet, the front edge of said back portion of the cabinet top wall terminating short of vertical alignment with the back edge of said front portion thereof and providing an access opening for said auxiliary storage space, a door for normally closing said auxiliary storage space access opening, said door including a horizontally disposed portion forming a complementary part of the back portion of said cabinet top wall, and said door being pivotally mounted upon said back portion of said cabinet top wall adjacent the front edge thereof whereby said door opens upwardly of said cabinet and the complementary wall forming part thereof rests upon the back portion of said cabinet top wall.

10. A refrigerating apparatus comprising in combination, a refrigerator cabinet having a plurality of insulated walls forming a food storage chamber therein, a closed refrigerating system associated with said cabinet and including a refrigerant evaporator for cooling the interior of said chamber, the cabinet top wall extending inwardly of the cabinet back wall and having its front edge terminating short of vertical alignment with the edge of a wall adjacent the front of said cabinet to provide an access opening for said chamber, a door for normally closing said chamber access opening, said door including an upright portion and a horizontal portion, and said horizontal portion of said door forming a complementary part of said cabinet top wall.

RAYMOND LOEWY.